Feb. 24, 1959 J. A. BENSON ET AL 2,874,536
COOLING MEANS FOR TAILPIPE
Filed March 18, 1954
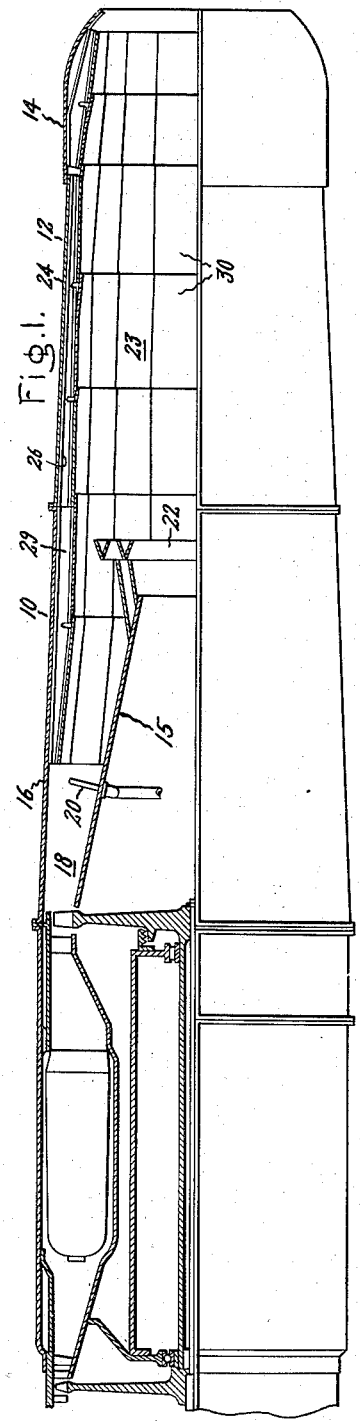
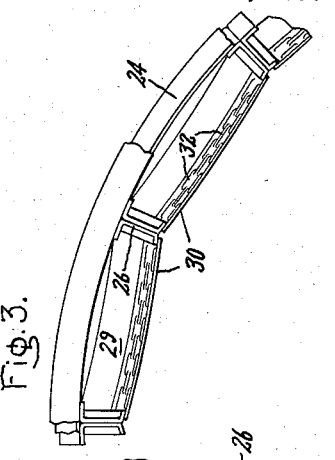
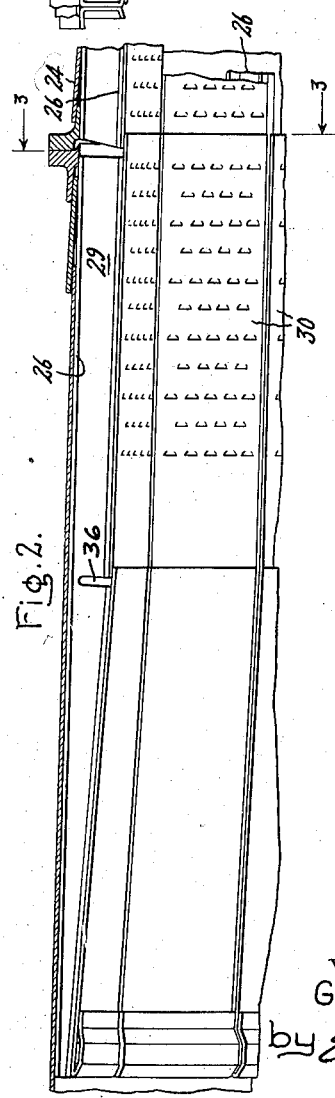
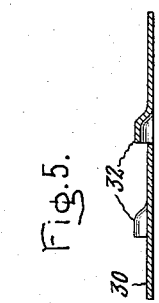
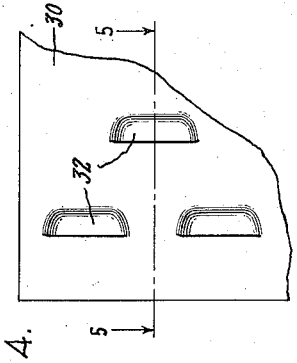
Inventors:
John A. Benson
Gilbert W. Crosby
by Edward M. Tittle United States Patent Office 2,874,536
Patented Feb. 24, 1959

2,874,536

COOLING MEANS FOR TAILPIPE

John A. Benson, Nahant, and Gilbert W. Crosby, Saugus, Mass., assignors to General Electric Company, a corporation of New York Application March 18, 1954, Serial No. 417,192

2 Claims. (Cl. 60—35.6)

This invention relates to thrust augmentation for an engine, and, in particular, to a louvered liner for cooling the tailpipe wall of an exhaust reheat system and other hot portions of the engine.

In general, a gas turbine has a large amount of available oxygen passing over the turbine buckets and out through the exhaust cone to the atmosphere. Many attempts have been made to provide additional thrust by adding fuel and utilizing the available oxygen in an afterburner. However, the utilization of this oxygen generates hot gases of very high temperatures and accordingly destroys the afterburner itself. It is, therefore, an object of this invention to provide means for cooling the afterburner skin to eliminate the destruction thereof so as to permit thrust augmentation.

It is well known that attempts have been made to use liners in the afterburner so as to provide adequate cooling means for the afterburner skin, thereby eliminating the destruction thereof. However, these liners have not proved entirely successful since proper cooling conditions are not provided for. This condition has to do with providing a film of cooling air adjacent to the liner so as to separate the metal from the hot flame area. Also, for example, a solid cylindrical liner would not be successful at the higher temperatures since buckling occurs. This buckling is due to hot spots being formed by the hot flame licking the skin in spotted areas. This tends to make the metal on the inboard side of the liner expand in all directions, therefore the metal will buckle in the direction of the high temperature side and sometimes in the other direction. At these very high temperatures the smooth air flow will become upset by these buckles and the engine will lose some efficiency. Also, these buckles will tend to result in cracking and the liner will destroy itself much sooner. It is, therefore, another object of this invention to provide a liner which is capable of eliminating the above difficulties.

It is a still further object of this invention to provide a liner for an afterburner which has a plurality of louvers therein capable of creating a film or boundary layer of cooling air or fluid adjacent to the liner so as to separate it from the hot flame area.

These and other objects will become more apparent when read in the light of the accompanying drawings wherein parts will be identified by specific names for convenience, but they are intended to be as generic in their application to similar parts as the prior art will permit, wherein:

Figure 1 is a cross sectional view of an engine showing an afterburner and a liner therefor;

Figure 2 is an enlarged view showing a portion of the burner and liner;

Figure 3 is a cross sectional view taken on line 3—3 of Figure 2;

Figure 4 is an enlarged view of the louvers;

Figure 5 is a cross sectional view taken on lines 5—5 of Figure 4.

Referring to the drawings the numeral 10 generally designates an afterburner having fixed thereto an exhaust pipe 12 terminating in an exhaust nozzle 14. The afterburner comprises an exhaust cone 15 and outer skin 16 so as to form a diffuser area 18 through which pass the hot gases from the turbine. In the diffuser area 18 are located a plurality of spray bars 20 for injecting fuel into the path of the hot gases so as to mix with the available oxygen therein. Ignition means (not shown) are placed in the path of the hot gases to ignite the mixture. A flame holder 22 is positioned just aft of the exhaust cone 15 which decreases the velocity within the flame holder so as to permit combustion therein. The area 23 just aft of the flame holder is where the high temperature hot flame is present. The tailpipe 12 comprises a skin 24 having fixed thereto by rivets or the like a plurality of longitudinally extending support members or I-beams 26 starting at a point such that no hot flame can enter the area between the liner and skin. Each of said I-beams 26 are provided with slots 36 extending partially transversely therethrough at various points longitudinally thereof. These beams 26 are 16 in number, but can be any other desirable number that will satisfy the requirements of having not too great nor too small an area between the I-beams. Fixed to the I-beams 26 are a plurality of plates 30 which cover the full length of the I-beams 26 so as to form a liner inside of the tailpipe skin 24. The liner, I-beams and tailpipe skin cooperate to form a plurality of longitudinally extending passageways 29. Also, since the temperature differential between the outer skin 24 and the liner may be of sufficient amount to create different thermal expansions thereof one end of each of the plates 30 are attached to the I-beams so as to compensate for differential thermal expansion in the axial direction such as shown in Figure 1 in the manner found in ordinary roofing shingles. In each of the plates 30 aft of the flame-holder 22 are formed a plurality of louvers 32. These louvers have a lip extending into the longitudinal passageways 29 so as to provide a means for scooping the air in order to form a boundary layer of cooling air adjacent to the liner. It is noted that the gases or fluid used for cooling purposes may be that from the turbine or any other source that may be desirable so long as its temperature could be sufficiently lower than that of the hot flame. Each plate 30 is preferably bowed inwardly as shown in Figure 3, so as to permit circumferential expansion of the liner. Otherwise, it would buckle or be torn loose from the I-beams. It is noted that the plates 30 could also be bowed outwardly.

When the hot gases leave the turbine buckets and pass down the diffuser 18 it has a temperature of approximately 1250° F. This gas is treated as a cooling gas since the temperature in the afterburner is in the neighborhood of 3500° F. The cooling air or hot gases from the turbine are taken into the longitudinally extending passageways 29 and directed by the lips of the louvers 32 through the louvers so as to form a boundary layer of cooling air. Therefore, the temperature differential between the inboard side of the liner and the outboard side of the liner is maintained at a minimum so as to be unharmful to the liner itself, thereby eliminating the possibility of buckling, cracking and destruction of the liner.

It is apparent the specific embodiment shown was given by way of example, and not by way of limitation. Many modifications, improvements and changes may be made to the above described structure without departing from the spirit and intent of this invention, and all of these modifications and improvements are to be included within the scope and intent of this invention.

Whereby we claim:

1. In a thrust augmentation device of the character described for a jet engine comprising means for utilizing the oxygen in the gases issuing from the turbine buckets of said jet engine, an afterburner, a high temperature flame area, a plurality of support members fixed to the afterburner, a plurality of plates rigidly connected to the support members so as to form a liner between the hot flame area and afterburner, means for permitting axial expansion of the liner with respect to the afterburner, and means for permitting circumferential expansion of the liner with respect to the afterburner, said means for permitting axial expansion of the liner including slots in said support members and each of said plates having one end fixed to the support members, said plates being affixed to said support members in longitudinally overlapping relationship at a plurality of longitudinally spaced locations.

2. A turbojet engine comprising a compressor, combustor, turbine, exhaust cone and thrust augmentation means including an afterburner assembly, said afterburner assembly having a reheat fuel injection means and flame holder for holding the flame, a liner positioned between the flame and afterburner skin so as to protect the afterburner skin from the hot flame, a plurality of longitudinally extending beams fixed to the afterburner skin, said beams having partial transverse slots therein to permit axial thermal expansion thereof, a plurality of bowed plates each having one of its ends fixed to said beams to permit axial and circumferential thermal expansion thereof, said plates being affixed to said beams in longitudinally overlapping relationship at a plurality of longitudinally spaced locations, louvers in said plates to provide means for directing air adjacent the inboard side of the liner to form a boundary layer of cooling air adjacent thereto.

References Cited in the file of this patent
UNITED STATES PATENTS

| | | |
|---|---|---|
| 2,268,464 | Seippel | Dec. 30, 1941 |
| 2,477,583 | DeZubay et al. | Aug. 2, 1949 |
| 2,544,538 | Mahnken et al. | Mar. 6, 1951 |
| 2,617,255 | Niehus | Nov. 11, 1952 |
| 2,631,429 | Jacklin | Mar. 17, 1953 |
| 2,639,578 | Pouchot | May 26, 1953 |
| 2,639,579 | Willgoos | May 26, 1953 |
| 2,651,912 | Abbott | Sept. 15, 1953 |
| 2,670,601 | Williams et al. | Mar. 2, 1954 |
| 2,794,319 | Stockdale | June 4, 1957 |